United States Patent
Cao

(10) Patent No.: US 10,345,529 B2
(45) Date of Patent: Jul. 9, 2019

(54) UNITARY CONNECTOR FOR CONNECTING TWO BARE OPTICAL FIBERS

(71) Applicants: Corning Research & Development Corporation, Corning, NY (US); Lisong Cao, Jiangsu (CN)

(72) Inventor: Lisong Cao, Jiangsu (CN)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 15/762,261

(22) PCT Filed: Oct. 12, 2015

(86) PCT No.: PCT/CN2015/091700
§ 371 (c)(1),
(2) Date: Mar. 22, 2018

(87) PCT Pub. No.: WO2017/063106
PCT Pub. Date: Apr. 20, 2017

(65) Prior Publication Data
US 2018/0299623 A1    Oct. 18, 2018

(51) Int. Cl.
*G02B 6/38* (2006.01)

(52) U.S. Cl.
CPC .......... *G02B 6/3806* (2013.01); *G02B 6/38* (2013.01); *G02B 6/3803* (2013.01)

(58) Field of Classification Search
None
See application file for complete search history.

(56) References Cited

U.S. PATENT DOCUMENTS

| 4,220,398 A | 9/1980 | Dalgoutte |
| 4,662,713 A | 5/1987 | Davies et al. |
| 4,755,018 A * | 7/1988 | Heng ............... G02B 6/3806 |
| | | 385/62 |

(Continued)

FOREIGN PATENT DOCUMENTS

| CN | 102269848 | 12/2011 |
| CN | 202075462 | 12/2011 |

(Continued)

OTHER PUBLICATIONS

International Search Report for PCT International Application No. PCT/CN2015/091700, dated Mar. 7, 2016, 5pgs.

(Continued)

*Primary Examiner* — Chad H Smith
(74) *Attorney, Agent, or Firm* — Adam R. Weeks

(57) ABSTRACT

An optical fiber connecting device (100) and method of optically connecting two optical fibers (50, 50') is described. The device (100) includes a housing (110), and first and second mechanical elements (130, 150) disposed within the housing (110). A first actuation cap (140) is disposed adjacent the first mechanical element (130) to secure a first optical fiber (50) within the first mechanical element (130) upon actuation, and a second actuation cap (160) disposed adjacent the second mechanical element (150) to secure a second optical fiber (50') within the second mechanical element (150) upon actuation. The first and second optical fibers (50, 50') can be positioned, secured and actuated in the connection device (100) at the same or at different times.

16 Claims, 13 Drawing Sheets

(56) References Cited

U.S. PATENT DOCUMENTS

| | | |
|---|---|---|
| 4,824,197 A | 4/1989 | Patterson |
| 4,850,671 A * | 7/1989 | Finzel .................. G02B 6/3806 385/69 |
| 4,971,424 A * | 11/1990 | Babirad ................ G02B 1/048 385/145 |
| 5,102,212 A | 4/1992 | Patterson |
| 5,138,681 A | 8/1992 | Larson et al. |
| 5,155,787 A | 10/1992 | Carpenter et al. |
| 5,159,653 A | 10/1992 | Carpenter et al. |
| 5,263,105 A | 11/1993 | Johnson et al. |
| 5,638,477 A | 6/1997 | Patterson et al. |
| 5,696,860 A | 12/1997 | Semura et al. |
| 6,951,425 B2 | 10/2005 | Vergeest |
| 7,001,084 B2 | 2/2006 | Carpenter et al. |
| 7,234,878 B2 | 6/2007 | Yamauchi et al. |
| 7,454,117 B2 | 11/2008 | Carpenter et al. |
| 8,295,669 B2 | 10/2012 | Park et al. |
| 9,383,526 B2 | 7/2016 | Hu et al. |
| 2005/0063662 A1 | 3/2005 | Carpenter |
| 2007/0297746 A1 | 12/2007 | Carpenter et al. |
| 2016/0124160 A1 | 5/2016 | Verheyden et al. |

FOREIGN PATENT DOCUMENTS

| | | |
|---|---|---|
| CN | 202771047 | 3/2013 |
| CN | 103364888 | 10/2013 |
| CN | 101504476 | 4/2014 |
| CN | 102590957 | 7/2014 |
| WO | WO 2006-036438 | 4/2006 |
| WO | WO 2006-036676 | 4/2006 |
| WO | WO 2008-118927 | 10/2008 |
| WO | WO 2015-031470 | 3/2015 |
| WO | WO 2017-063107 | 4/2017 |
| WO | WO 2017-064588 | 4/2017 |

OTHER PUBLICATIONS

EP15905991.4 Search Report dated Apr. 29, 19, European Patent Office, 11 Pgs.

* cited by examiner

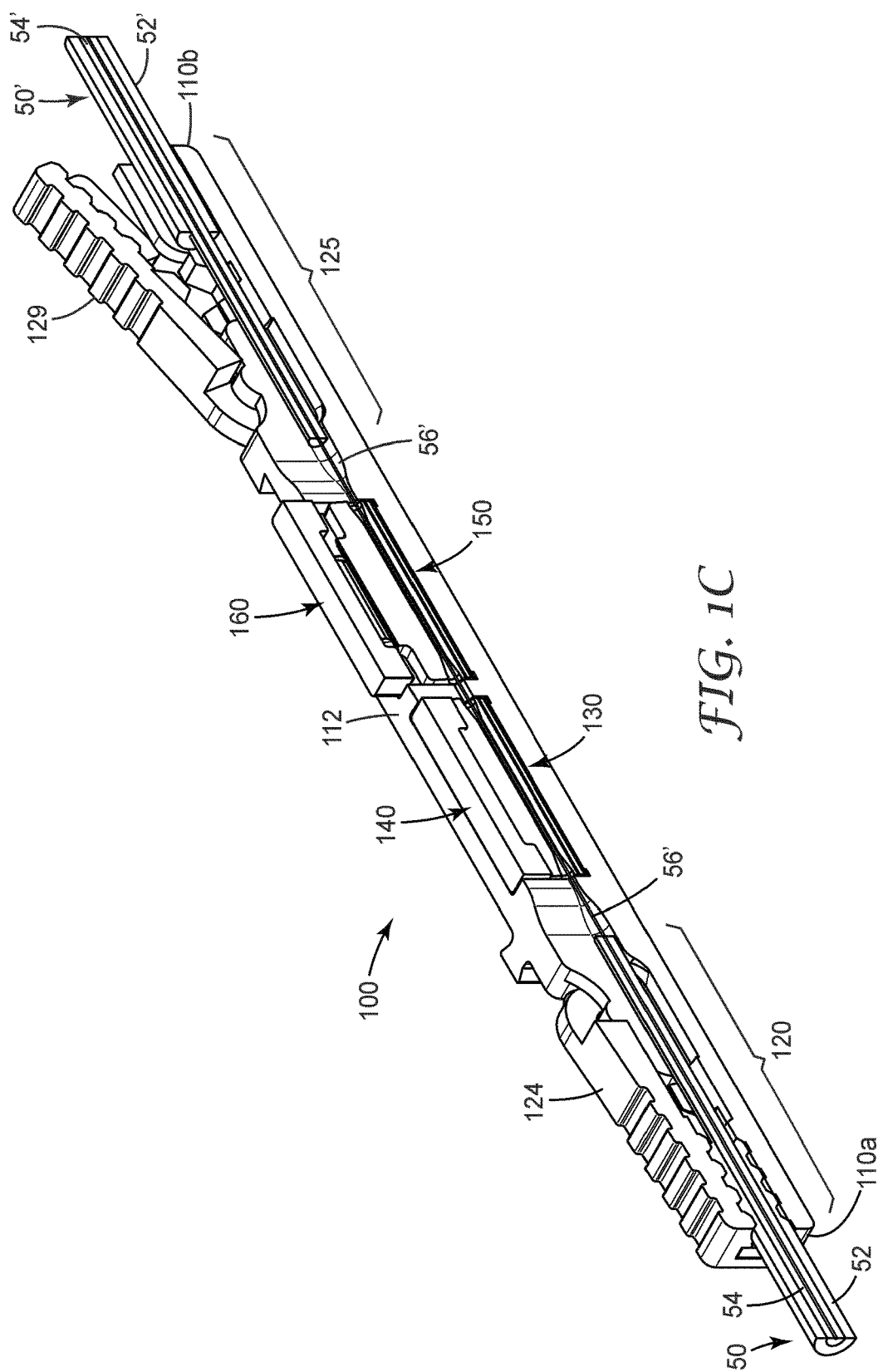

UNITARY CONNECTOR FOR CONNECTING TWO BARE OPTICAL FIBERS

FIELD

The present description relates to a fiber optic connector for connecting two bare optical fibers and to a method of connecting two bare optical fibers.

BACKGROUND

With the increasing use of mobile devices, the demand for high speed access to voice, video and data is rapidly growing, driving the need for more, higher speed optical communication lines and higher density connections between the optical communications network. Network providers will frequently install new optical communications parallel to existing copper communication lines to help handle the added bandwidth that customers are demanding. In order to streamline costs and maximize efficiency of the network infrastructure, the network providers will often retrofit the existing copper infrastructure to accommodate the new optical communication lines. This can be especially challenging in roadside cross connect cabinets which have a finite volume. Another issue facing network providers is the higher degree of skill and new installation tooling required for the field technician to join optical communication lines.

Additional issues can arise at data centers which serve as the nexus between the copper and optical communication networks. Large data centers may typically need to manage several thousand or tens of thousands of single fiber connections at the patch panel level on a single rack. The space and simplicity of use of these single fiber connections are the key needs in high count fiber datacenters. Currently, many data center customers are using traditional fusion splicing or factory made fiber termination solutions.

Conventional fusion splicing is commonly used to simultaneously connect two optical fibers together for fiber to the home installations. For example, a fiber from subscriber ONU pigtail can be directly connected to a fiber from Floor Distribution Unit (FDU) connection panel. Fusion splicing requires highly skilled technicians to have high quality optical fiber cleaver and a fusion splice machine in order to create the fusion splice inside of a heat shrinkable protective tube.

Conventional single fiber terminations commonly employed in data centers utilize two male connectors (e.g., SC or LC format optical fiber connectors), and a corresponding adapter, to interconnect a pair of optical fibers. Standard epoxy and ferrule based optical fiber connectors require several precision components (e.g., springs, ferrules, housings, shrouds, and the like) that may result in a higher cost termination solution because these connectors can require more tools, skill and time to install in the field. Additionally, epoxy connectors are more suitable for factory termination.

On the front side of a data center rack, patch cords are used to interconnect a pair of ports. Factory assembled patch cords are assembled in discrete lengths with a male optical fiber connector disposed on each end. Because the patch cords are pre-assembled, the patch cord length may be much longer than what is necessary for a given patching connection, potentially resulting in large amounts of excess cable that need to be managed and stored.

On the back side of a data center rack, multi-fiber input cables have to be spliced to connectorized pigtails. The need to accommodate splicing capacity on the rack requires the use of valuable real estate and reduces the patching capacity of the rack.

More recently, field terminated optical connectors having a factory prepared and installed fiber stub and a mechanical splice element have simplified installation procedures so that connectors are easier to use in the field. However, using a conventional field mountable connection termination solution still requires two optical connectors and an adapter, and one may desire to have a solution with fewer necessary components.

Thus, there is a need for a high density field connection system that has a minimal number of parts and that enables simplified installation and assembly.

SUMMARY

In a first embodiment, the present description relates to an optical fiber connecting device for housing a mechanical element for aligning, gripping, and connecting first and second optical fibers. Each optical fiber including a bare glass portion surrounded by a buffer layer. The device includes a housing having a main body, a first mechanical element and a second mechanical element for axially aligning and gripping the first and second the bare glass portions of the first and second optical fibers disposed in the main body and first and second actuating caps. The first actuation cap is disposed adjacent to the first mechanical element and can be actuated to secure a first bare glass portion of the first optical fiber within the first mechanical element, and the second actuation cap disposed adjacent to the second mechanical element that can be actuated to secure a second bare glass portion of the second optical fiber within the second mechanical element. The first and second optical fibers can be positioned, secured and actuated in the connection device at the same or at different times.

In another embodiment, the present description relates to a method of connecting two optical fibers. The method includes the following steps: 1) providing a first optical fiber having a bare glass portion surrounded by a buffer layer; 2) providing a second optical fiber having a bare glass portion surrounded by a buffer layer; 3) sliding the bare glass portion of the first optical fiber into a first end of the optical connection device; 4) locking the first optical fiber into the first mechanical element by depressing the first actuation cap; 5) sliding the bare glass portion of the second optical fiber into a second end of the optical connection device opposite the first end until the second optical fiber experiences resistance and cannot be pushed further; and 6) locking the second optical cable in the second mechanical element by depressing the second actuation cap.

In yet another embodiment, the present description relates to a method of connecting two optical fibers. A factory mounted optical fiber connecting device is preterminated on a first terminal end of an optical fiber, wherein the optical fiber connecting device includes a first mechanical element and a second mechanical element disposed in a housing, wherein the first optical fiber is secured in the optical connecting fiber device by the first mechanical element. In the field, a second optical fiber is prepared to expose a bare glass portion at the terminal end of the second optical fiber. The bare glass portion of the second optical fiber is inserted or slid into a second end of the optical fiber connecting device and into the second mechanical element where the second optical fiber is locked in place by depressing a second actuation cap.

BRIEF DESCRIPTION OF THE DRAWINGS

FIGS. 1A-1G are seven views of an optical fiber connecting device according to the present invention.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
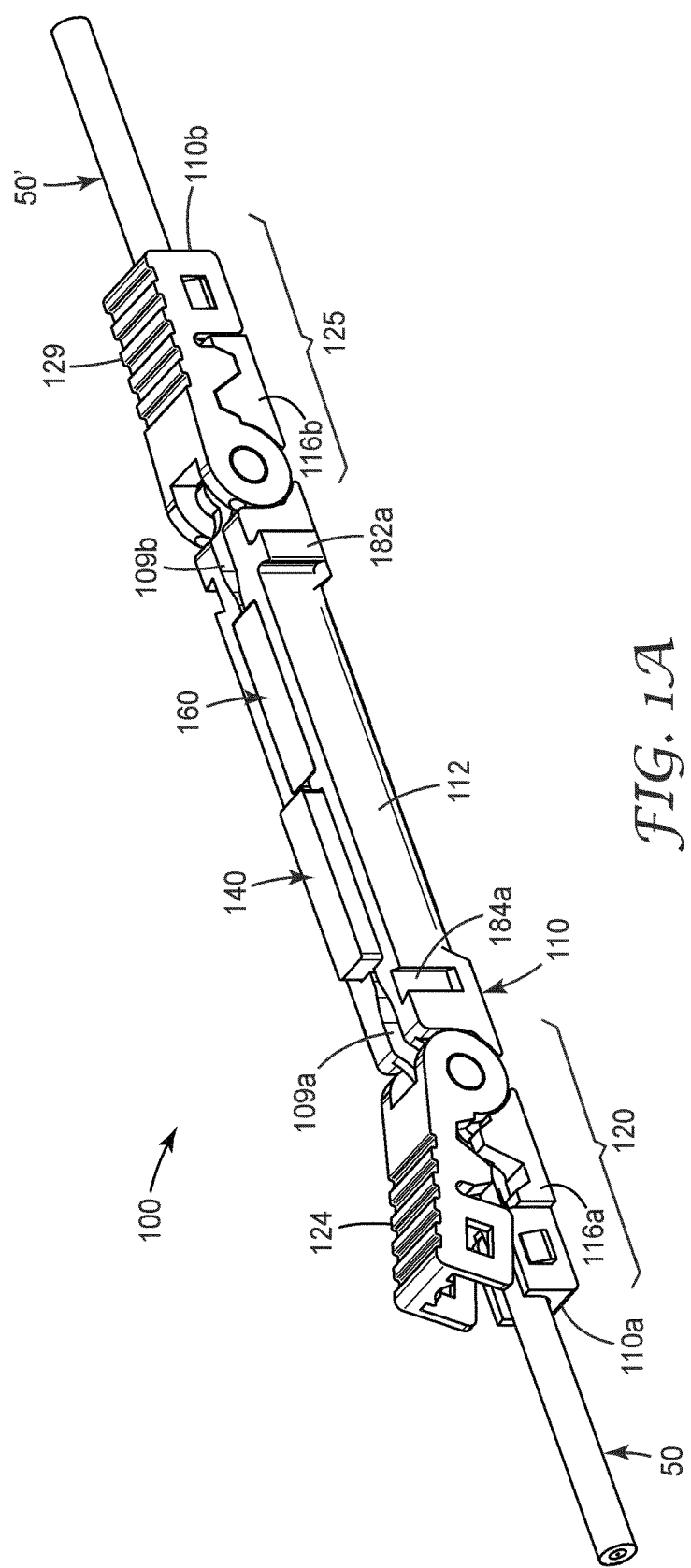

In the following detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

The present invention is an optical fiber connecting device that allows the direct connection of two optical fibers in a small form factor device. In an exemplary aspect, the procedure used to terminate one or more optical fibers more closely mirrors installation procedures used when making connections in conventional copper networks. The exterior coating layers on the optical fiber are removed and the end of the fiber is cleaved. The fiber is inserted into one side of the optical fiber connecting device until resistance is felt and the fiber begins to bow. An actuation mechanism of the optical fiber connecting device can be depressed or otherwise engaged to secure the prepared end of the optical fiber in the connecting device. The end of a second optical fiber can be prepared and terminated in a similar fashion by engaging a second actuation mechanism. In an exemplary aspect, one or more of the actuation mechanisms can be disengaged so that the optical fiber held in that portion of the optical fiber connecting device can be removed or repositioned and secured in the device. The exemplary device provides independent engagement of the optical fibers connected by the device which allows the optical fibers to be connected at the same time or at two different times such that installation of the second optical fiber will not disturb the optical fiber already installed in the device.

FIGS. 1A-1D show an exemplary optical fiber connecting device 100 for independently securing two optical fibers 50, 50'. Because each fiber is terminated independently, the exemplary optical fiber connecting device can be factory terminated onto one of the optical fibers, saving the installer time, or can be installed onto one of the optical fibers during installation or expansion of an optical fiber network, and the optical connection with a second optical fiber can be made at a later time. In an alternative aspect, the exemplary optical fiber device can be connected to two optical fibers simultaneously to make an optical connection.

The optical fibers 50, 50' can be a conventional optical fiber cable such as a 250 µm or 900 µm buffer coated fiber, Kevlar® reinforced jacketed fiber, a jacketed drop cable or other sheathed and reinforced fiber. The optical fiber of the optical fiber cable can be single mode or multi-mode. For example, multi-mode fibers can have a 50 µm core size, a 62.5 µm core size, or a different standard core size, while single mode optical fibers typically between about 8 µm and about 10.5 µm. In an alternative aspect, the optical fiber cable can comprise a conventional plastic optical fiber. In yet another aspect, the optical fiber cable can be an FRP drop cable, a 1.6 mm to 6.0 mm jacketed round drop cable, a flat drop cable, or other optical fiber drop cable. In an exemplary aspect, drop cables from a demarcation point can be connected to an indoor/outdoor type of 4.8 mm to 6 mm or approximately 3 mm fiber cable. In the exemplary aspect shown in the figures, optical fibers 50, 50' include a bare glass portion 56, 56' disposed within a buffer coating 54, 54' which is disposed in an outer coating layer 52, 52'. The outer coating layer can be another buffer layer, an indoor jacket or a ruggedized outdoor jacket. In some aspects, 250 µm or 900 µm buffer coated fiber can be disposed in a larger diameter buffer tube or a short piece of buffer tubing that provides added strain relief as the optical fiber exits the exemplary optical fiber connecting device.

Optical fiber connecting device 100 includes a housing 110 containing two mechanical elements (i.e. first mechanical element 130 and second mechanical element 150) to axially align and grip the bare glass portions of two optical fibers.

Housing 110 has a main body 112 having a first end 110a, a second end 110b, and a channel 109 extending longitudinally through the main body from the first end to the second end of the main body to guide the optical fibers being connected within optical fiber connecting device 100. The main body includes at least one widened area or opening 114a, 114b (collectively 114) formed along the top of the channel to provide access to the at least one cavity 115a, 115b (collectively 115) within the main body. In the exemplary embodiment shown in FIG. 1B, the main body includes two elongated openings 114a, 114b formed along the centerline of the channel 109 to provide access to cavities 115a, 115b. The first and second mechanical elements 130, 150 can be inserted through the openings and secured within housing 110 in the cavities. In particular, the first mechanical element 130 can be inserted through first opening 114a and secured in first cavity 115a, while the second mechanical element 150 can be inserted through second opening 114b and secured in second cavity 115b.

In an exemplary embodiment, mechanical elements 130, 150 can be formed of a ductile material which is folded to create the mechanical element. Each element includes a fiber gripping channel or alignment groove formed in the interior surface to secure and/or grip at least one optical fiber. For example, commonly owned U.S. Pat. No. 5,159,653, incorporated herein by reference in its entirety, describes an optical fiber splice device (similar to a 3M™ FIBRLOK™ II mechanical fiber optic splice device) that includes a mechanical element that comprises a sheet of ductile material having a focus hinge that couples two legs, where each of the legs includes a fiber gripping channel (e.g., a V-type (or similar) groove) to optimize clamping forces for conventional glass optical fibers received therein. The ductile material, for example, can be aluminum or anodized aluminum. If the mechanical element will be used to join a pair of optical fibers, a conventional index matching fluid can be preloaded into the V-groove region of the mechanical element for improved optical connectivity within the mechanical element. Other conventional mechanical elements can also be utilized in accordance with alternative aspects of the present invention and are described in U.S. Pat. Nos. 4,824,197; 5,102,212; 5,138,681; and 5,155,787, each of which is incorporated by reference herein, in their entirety.

Figure 1B:
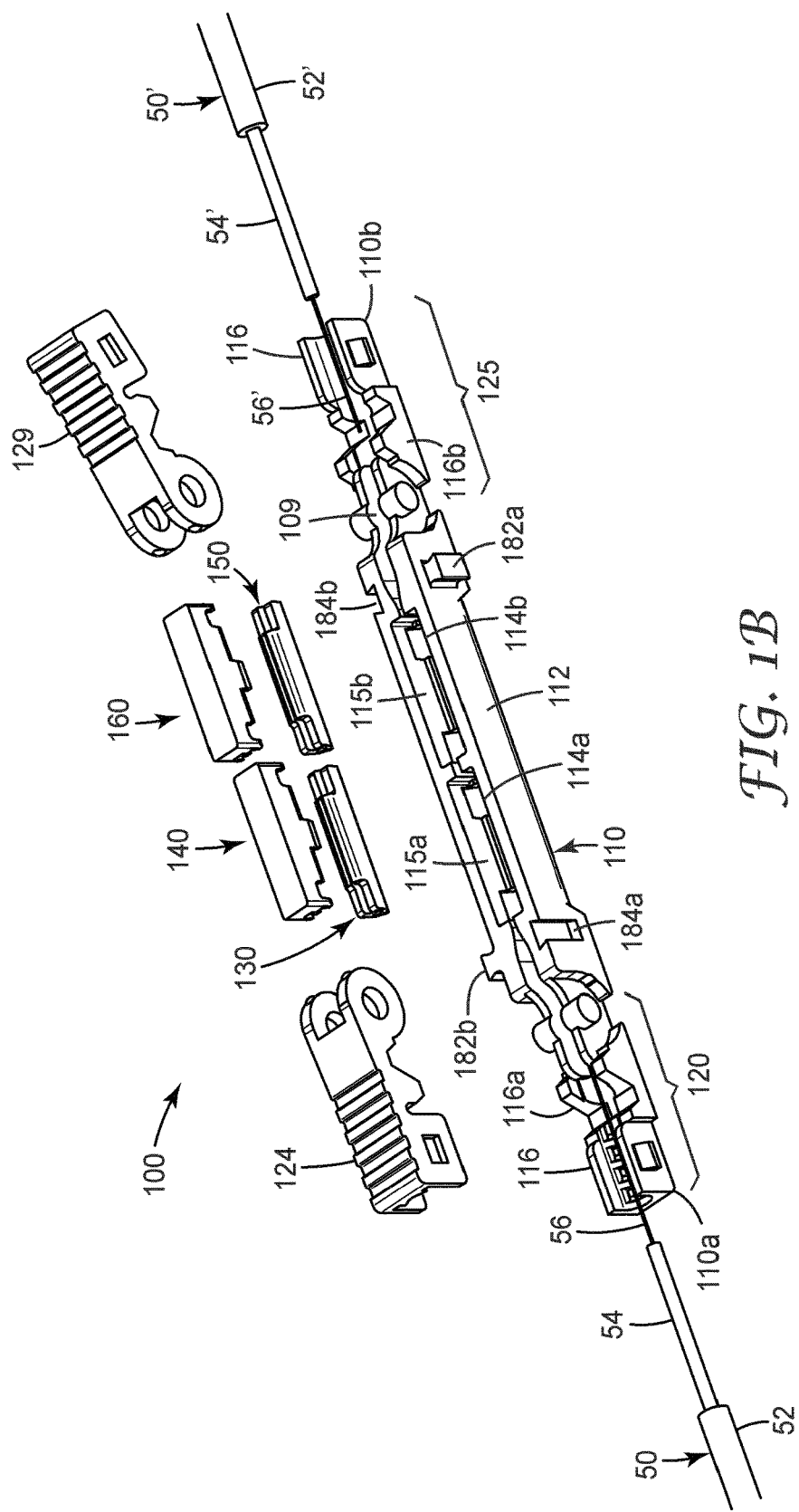
Figure 1D:
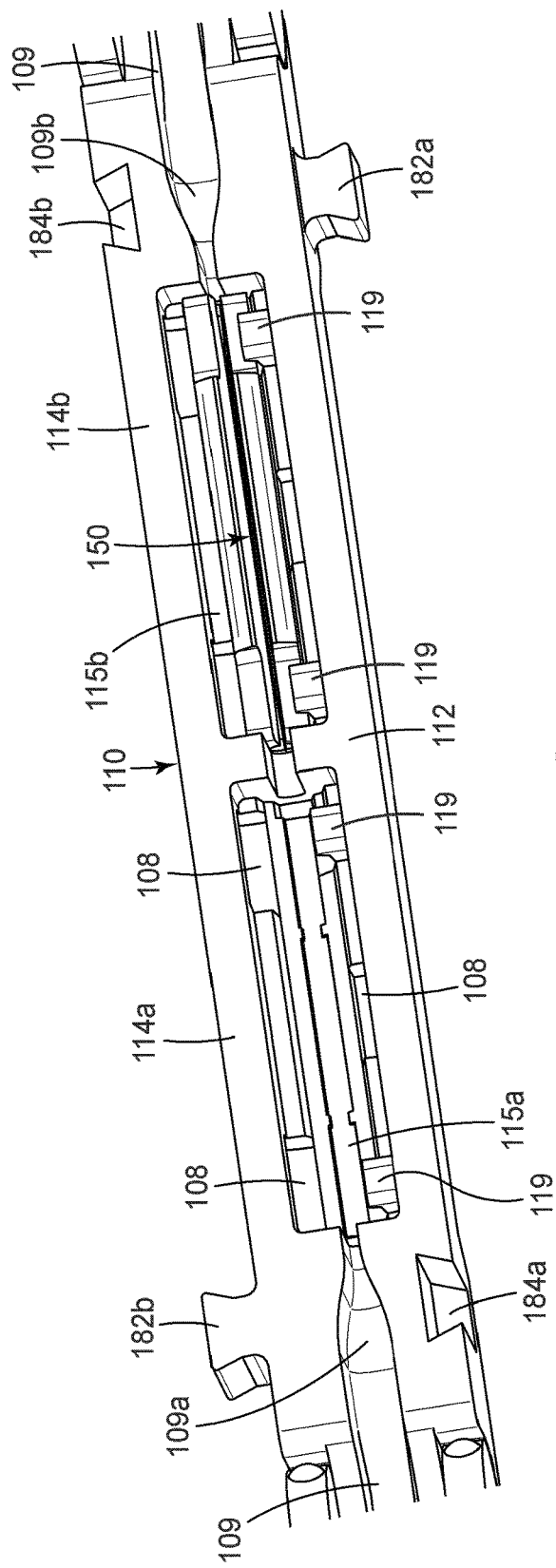
Figure 1E:
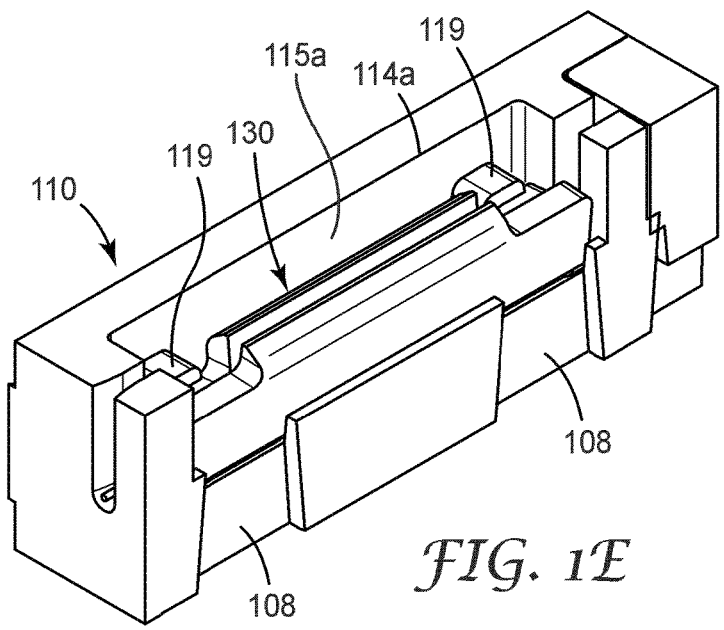

Each of the first and second mechanical elements 130, 150 can be mounted in cavities 115a, 115b located within a central portion of the housing's main body 112 and accessed through openings 114a, 114b as shown in FIGS. 1C and 1D. In particular, FIG. 1C is a cross-section of optical fiber connecting device 100 showing the mechanical elements disposed in cavities 115a, 115b and FIG. 1D is a top view of a portion of the exemplary optical fiber connecting device looking into cavity 115a. In an exemplary embodiment, the cavities are integrally formed in the main body, e.g., by molding. The cavities secure (through e.g., snug or snap-fit) the axial and lateral position of the first and second mechanical elements. The cavities can hold the first and second mechanical elements such that the mechanical elements cannot be rotated, or easily moved forward or backward once installed. The mechanical elements can be retained by clearance fit below one or more overhanging tabs 119 provided within the cavity (as shown in FIGS. 1D and 1E). Cavity 115 is configured to allow the mechanical element 150 to be inserted by tilting the mechanical element away from the retaining tabs. Once the mechanical element is fully seated, it can be tilted toward the tabs which brings a portion of the mechanical element under the tabs to retain the mechanical element in a vertical direction. Once both mechanical elements are installed in the main body, first actuation cap 140 can be placed over the first mechanical element through opening 114a preventing the first mechanical element from tilting away from the retaining tabs. Similarly, a second actuation cap 160 can be placed over the second mechanical element through opening 114b.

Figure 1F:
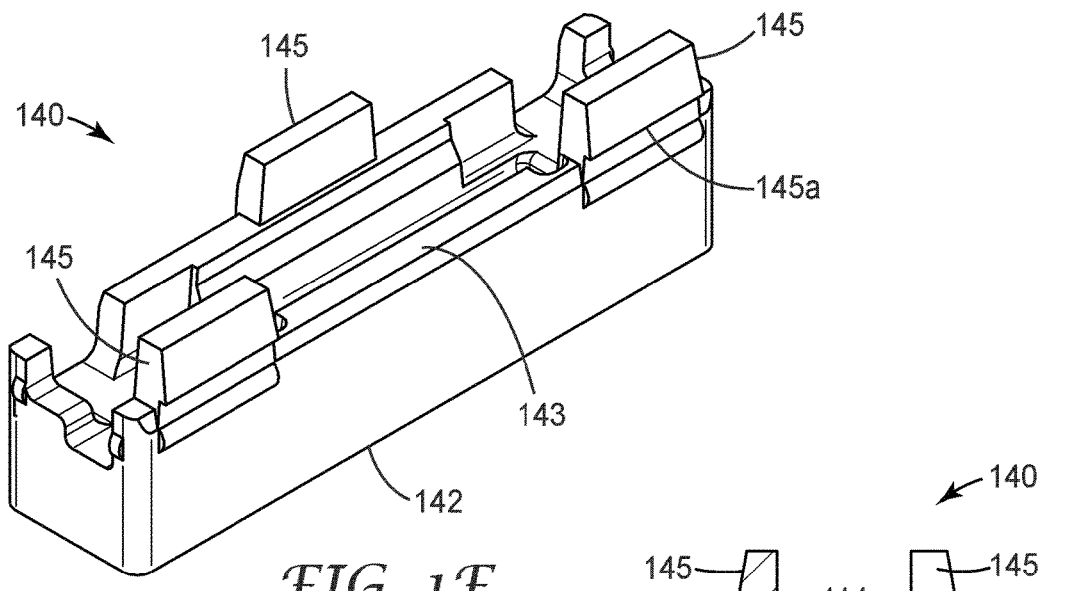
Figure 1G:
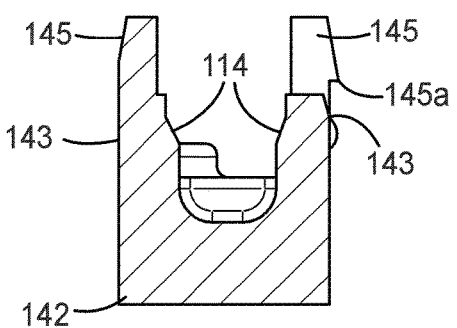

The actuating caps for engageably mating with the first and second mechanical elements are described in reference to FIGS. 1F and 1G. Actuating cap 140 includes a main body portion 142 that extends along a length of the cap. The main body portion includes two side walls 143 configured to extend down over the sides of the mechanical element. The side walls have an interior cam surface 114. The cam surfaces on the interior of the side walls have a first portion near the top of the main body portion wherein the cam surfaces of the first portions are closer to one another than at a second portion near the edges of the side walls. There is a sloped transition portion between the first and second portions of the cam surface to aid the cap in sliding down over the mechanical element when actuated. When the actuating cap is pushed down toward the mechanical element, the legs of the mechanical element slide along the transition portion such that the transition portion pushes the legs of the gripping element towards each other to a closed position to secure an optical fiber passing at least partially through the mechanical element.

In addition, cap 140 can include a plurality of extensions 145 extending from the sidewalls of the cap. The extensions serve as guides that aid in aligning the cap as it is inserted into the cavity within the main body 112 of the exemplary optical fiber connecting device. In an exemplary aspect one or more of the extensions can have a lip 145a protruding from a surface of the extension to secure the actuation cap within the optical fiber connecting device after actuation to secure than optical fiber within the mechanical element.

In one exemplary aspect, the main body 112 can be configured to allow for the removal of the actuation caps to allow opening of the mechanical elements so that the bare glass portion of the optical fiber can be repositioned or removed from the mechanical element. For example, in FIGS. 1D and 1E, main body 112 can include at least one slot 108 that is accessible from the side opposite the actuation cap 140, 160 (i.e. from outside of the main body) to allow the insertion of a tool to push extensions on the actuation cap upwards to at least partially release the mechanical element allowing the legs of the mechanical element to separate, thus permitting removal and/or repositioning of the bare class portion of at least one optical fiber disposed in the mechanical element.

Figure 2A:
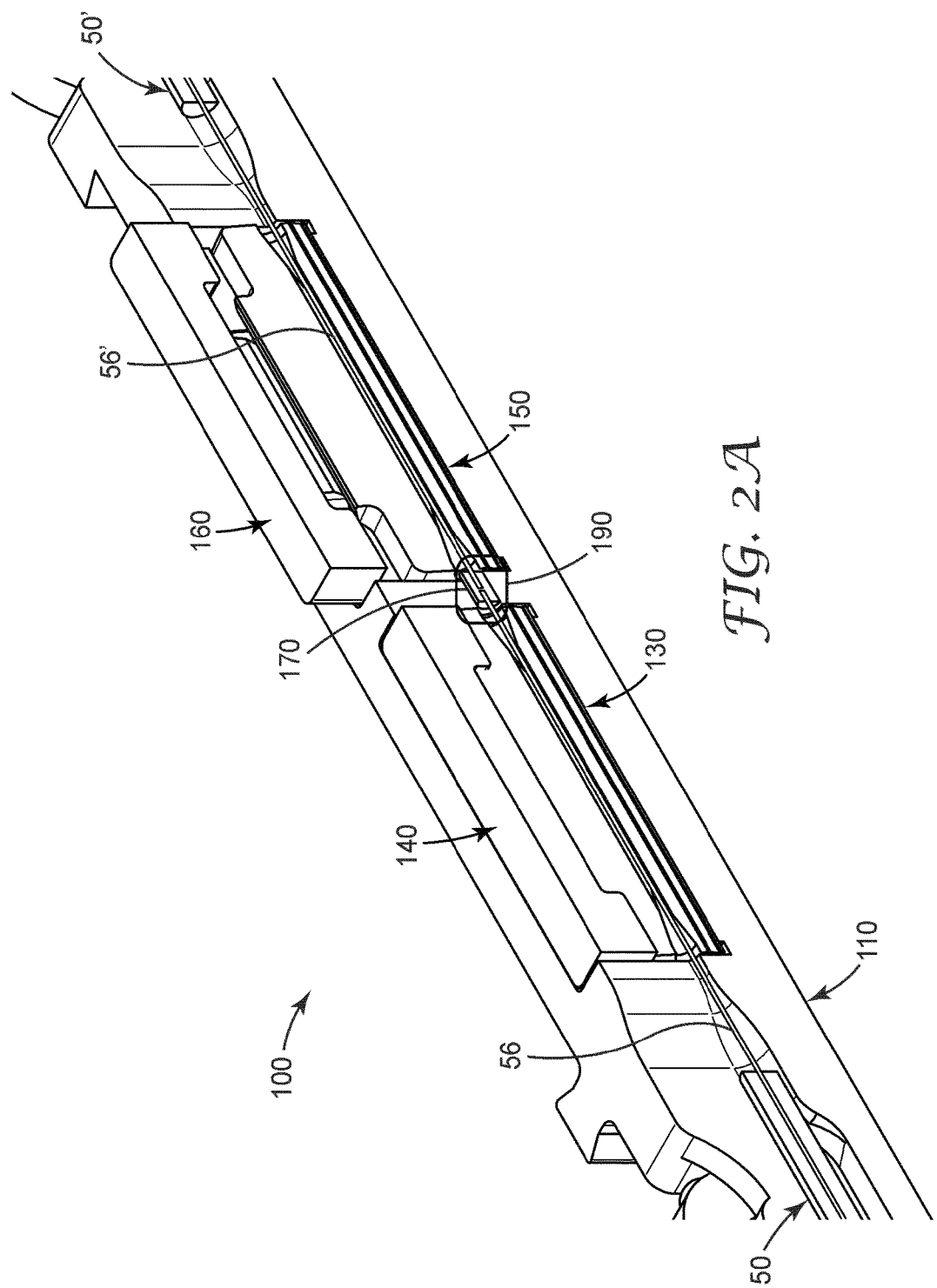
FIGS. 2A-2C are three cross sectional detail views showing three alternative optical connection interfaces possible with the optical fiber connecting device of FIG. 1A.

In one aspect, the first and second mechanical elements 130, 150 can be gripping elements such that the optical interface (positioned in highlight frame 190) between the bare glass portion 56 of the first optical fiber and the bare glass portion 56' of the second optical fiber connected by the optical connection device 100 is disposed between the first and second mechanical elements as shown in FIG. 2A. In this aspect, the bare glass portions 56, 56' of the first and second optical fibers 50, 50' extend through the first and second mechanical elements, respectively, to meet in an alignment element 170 disposed between the first and second mechanical elements. Alignment element 170 can be in the form of a ceramic or plastic ferrule secured in the main body 112 between the first and second mechanical elements. The alignment element can be generally cylindrical in shape and have a bore extending between the funnel shaped entrance regions. The funnel shaped entrance regions guide the bare glass portions of the first and second optical fibers into the bore of the alignment element. The diameter of the bore is slightly larger than the diameter of the bare glass portions of the first and second optical fibers and serves to radially constrain the positions of the bare glass portions of the first and second optical fibers, thus ensuring their alignment.

Figure 2B:
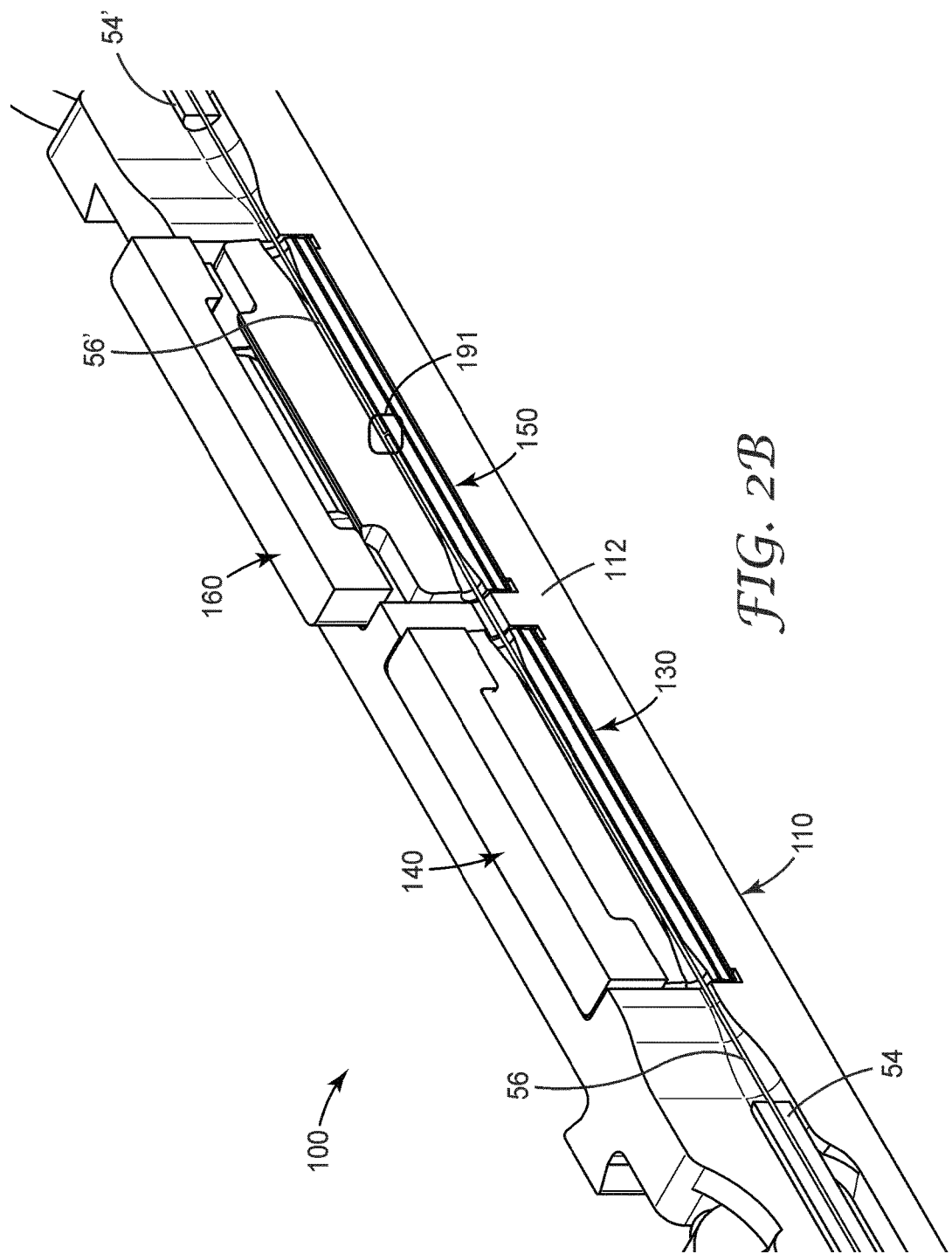

In another exemplary aspect, one of the first and second mechanical elements 130, 150 can be a gripping element while the other of the second and the first mechanical elements acts as a mechanical splice element as shown in FIG. 2B. For example, when the first mechanical element 130 is a gripping element and the second mechanical element 150 is a splice element, wherein the optical interface (positioned in highlight frame 191) is disposed within the second mechanical element. Thus, the bare glass portion 56 of the first optical fiber extends completely through the first mechanical element and part way through the second mechanical element. The first activation cap 140 can be depressed to hold the first fiber securely in the exemplary connection device 100. In this way, the optical fiber connecting device 100 can be mounted on the end of the optical fiber at a first time such as in the factory or during initial installation into the network. Then at a second later time, such as at the time when a customer requests services, bare glass portion 56' of the second optical fiber can be inserted into the main body 112 and into the second mechanical element 150 until resistance is felt and the fiber begins to bow when the terminal end of the second optical fiber abuts against the terminal end of the first optical fiber that is already installed in the connection device. The second actuation cap 160 can be depressed to anchor the second optical fiber in the connection device.

Figure 2C:
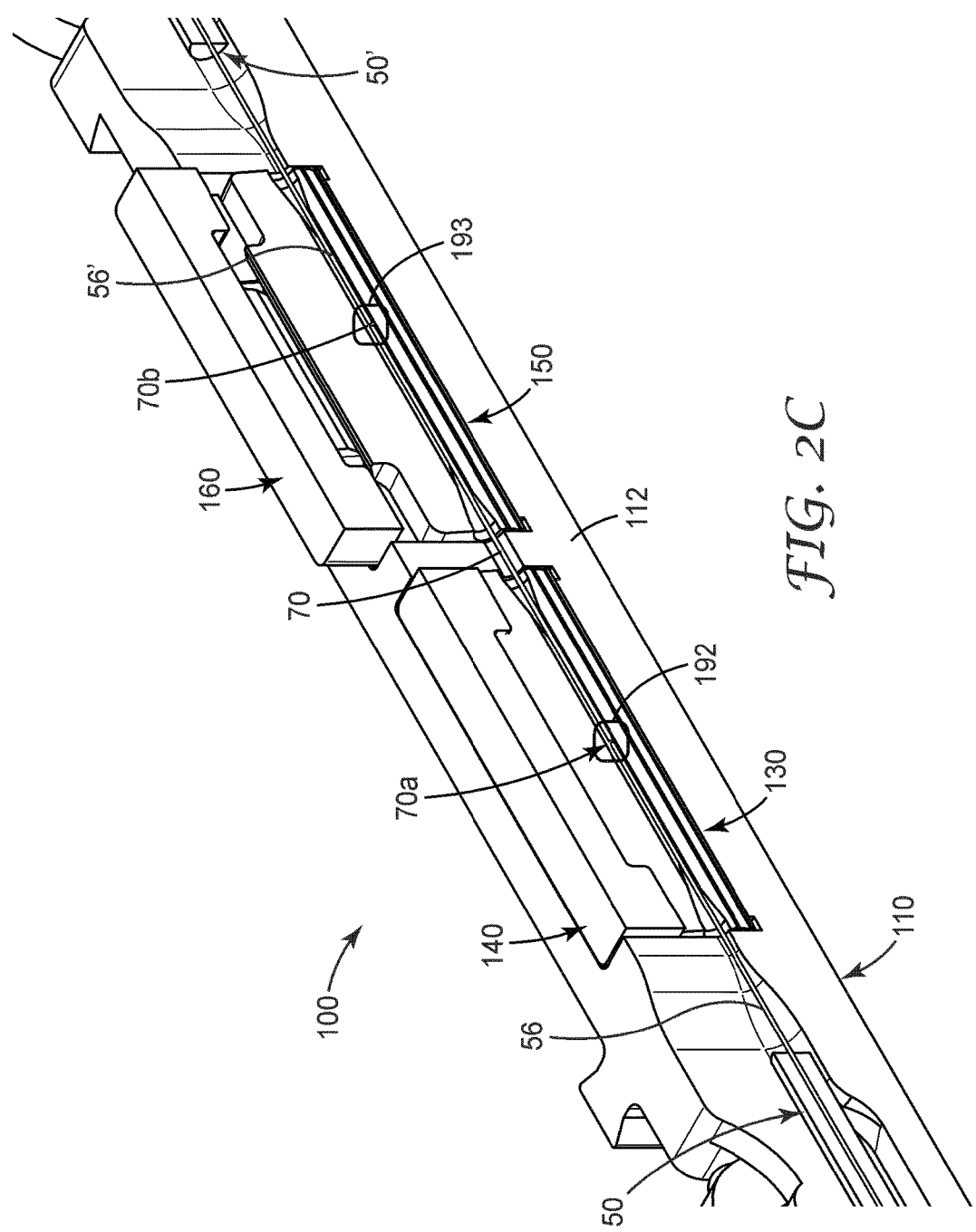

In a third aspect, both the first and second mechanical elements 130, 150 are splice elements as shown in FIG. 2C. In this aspect, the connection device incudes an optical fiber stub 70 having a first end 70a and a second end 70b positioned within the main body 112 of the optical fiber connecting device 100 wherein the first end of the fiber stub extends partially within the first mechanical element 130 and wherein the second end of the fiber stub extends partially within the second mechanical element 150. Thus, the bare glass portion 56 of the first optical fiber 50 can be inserted into the first end of the main body and into the first mechanical element until resistance is felt and the fiber begins to bow when the terminal end of the first optical fiber abuts against the first end of the optical fiber stub that is pre-installed in the connection device. The first actuation cap 140 can be depressed to anchor the first optical fiber in the connection device to optically connect the first optical fiber with the optical fiber stub (depicted in highlight frame 192). Then, the bare glass portion 56' of the second optical fiber 50' can be inserted into the main body and into the second mechanical element 150 until resistance is felt and the fiber begins to bow when the terminal end of the second optical fiber abuts against the second terminal end of the optical fiber stub. The second actuation cap 160 can be depressed to anchor the second optical fiber in the connection device optically connecting the second optical fiber and the optical fiber stub (depicted in highlight frame 193). In an exemplary aspect the optical fiber stub can have a Bragg grating formed in the core of the fiber stub or can have a thin film filter formed on an end of the fiber stub to form a sensor or a wavelength specific reflector or filter.

All three aspects above illustrate that the first and second optical fibers can be positioned, secured and actuated in the connection device independently and at the same or different times.

In operation, the actuation caps 140, 160 can be moved from an open position to a closed position (e.g. downward in the embodiment depicted in FIG. 1A). The cam surfaces on the interior of the actuating cap can slide over legs of the mechanical element, urging the legs toward one another to secure the bare glass portion of the optical fiber between them. In particular, the bare glass portion(s) of the optical fiber(s) are held in grooves formed on the interior surface of the legs of the in the mechanical element.

Referring to FIGS. 1A-1C and FIGS. 3A and 3B, housing 110 of optical fiber connecting device 100 can further include a first clamping region 120 disposed at a first end 110a of the housing and second clamping region 125 formed at a second end 110b of the housing opposite the first clamping region. Thus, the first and second mechanical elements 130, 150 lie within channel 109 between the first and second clamping regions so that the first and second clamping regions can provide strain relief for the first and second optical fibers 50, 50' disposed within the exemplary connection device. In an exemplary aspect channel 109 can include fiber guiding features 109a, 109b adjacent to the clamping regions to facilitate introducing and aligning the bare class portions of the optical fibers into the mechanical elements.

Figure 3A:
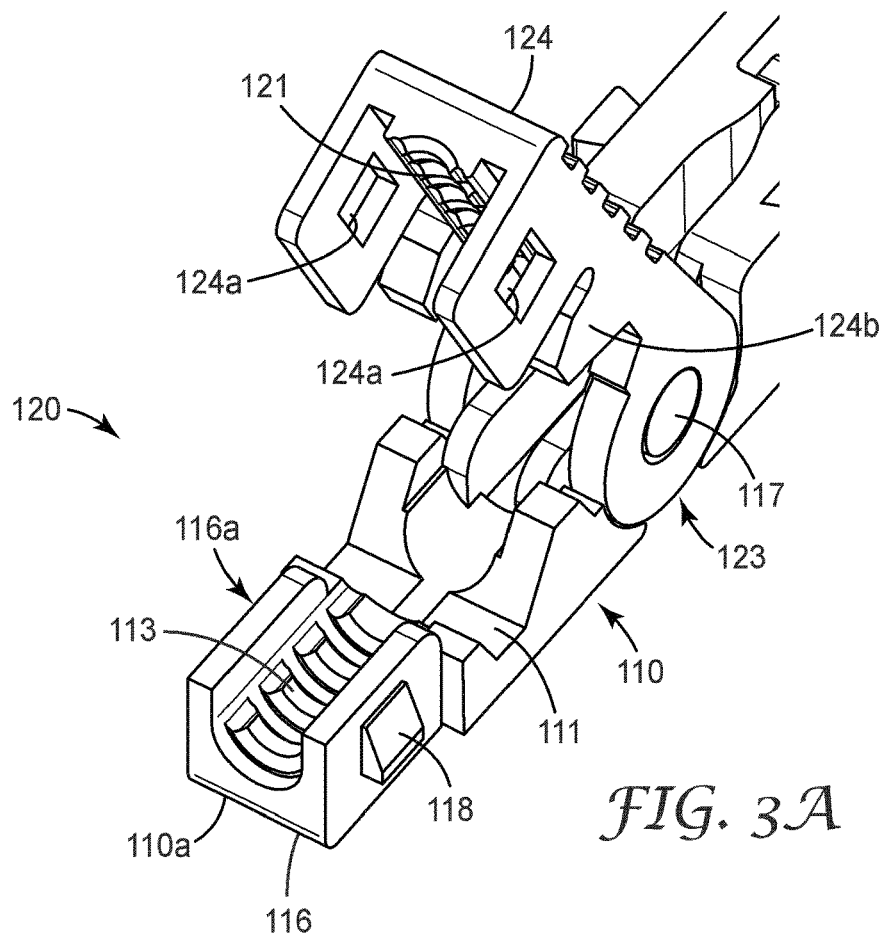
FIGS. 3A-3B are two detail views of a clamping region of the optical fiber connecting device of FIG. 1A.
Figure 3B:
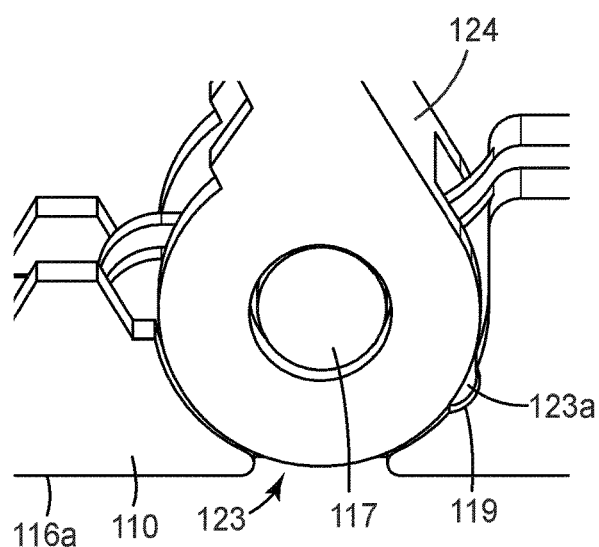

Clamping regions 120, 125 each comprise a clamp mechanism. In an exemplary aspect, the first and second clamping regions comprises an alligator-style clamp. Each clamp mechanism can include a base 116a, 116b (collectively 116), which is integrally formed with the main body 112 of the housing 110, and a cover 124, 129 which is rotatable connected to the base. FIGS. 3A and 3B are two detail views of an exemplary clamping region 120 of the optical fiber connecting device of the present disclosure. Each clamping mechanism includes locking features such as a catch 124a and a latch 118 that cooperate to secure the clamping mechanism in a closed position, thus anchoring the optical fiber being terminated in the exemplary optical fiber connecting device. In the exemplary aspect shown in FIG. 3A, the first end of 110a of optical fiber connecting device 100 includes a pair of latches 118 (only one is shown in the figure) disposed on either side of housing 110 and a pair of catches disposed on either side near the free end of the cover. In an alternative aspect, the catches can be formed on the housing and the latches formed on the cover. The securing features described herein are only exemplary. One of ordinary skill in the art could easily derive other securing features to secure the clamping mechanism in a closed state.

As mentioned, cover 124 is rotatably attached to housing by a pivot hinge comprising a pair of pegs 117 disposed on either side of housing 110 and a pair of sockets 123 disposed on either side of the cover. The sockets can have an opening that extends through the sidewalls of the cover or a depression formed on the inside of the cover sidewalls. The diameter of the sockets will be slightly larger than the diameter of the pegs which fit into them to allow for smooth rotation of the cover from an open to a closed position.

In an exemplary aspect, a small detent 123a can be formed on the cover to hold the cover 124 in an open position as shown in FIG. 3B. The detent initially resides in notch 119 in housing 110. When force is applied to the cover the detent will slip out of the notch allowing the cover to close.

Each of the covers 124, 129 and the base portions 116a, 116b formed in housing 110 of the clamping mechanisms 120, 125 can include a plurality of sharp ridges 113, 121 which can bite into the coating surrounding the bare glass portion of the optical fiber whether it be a cable jacket material or a buffer tube through which the optical fiber passes or a buffer coating formed on the optical fiber.

Advantageously, optical fiber connecting device 100 can also include an auxiliary strength member gripping feature. For example, the optical fiber connecting device 100 can include a trough 111 formed in the base portions 116 of the clamping mechanism 120 and buttresses 124b formed on the cover 124, as shown in FIG. 3A, that can be used to trap Kevlar, glass fiber or other flexible strength member materials within the clamping mechanism providing enhanced strain relief for optical fiber cables utilizing these types of strength members.

Figure 4:
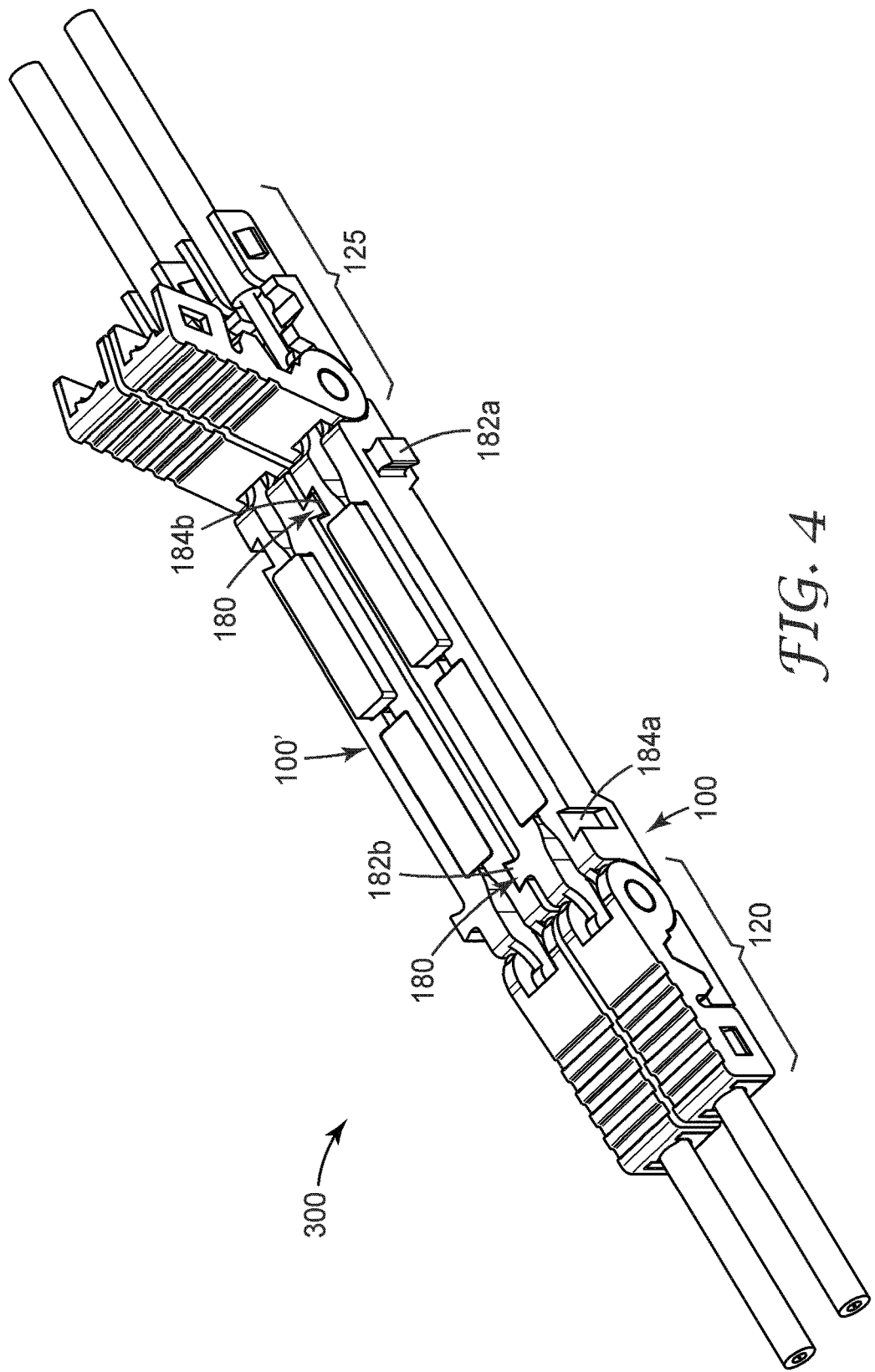
FIG. 4 is an isometric view of an assembly of optical fiber connecting devices according to the present invention.

Optical fiber connecting device can also include an integral coupling mechanism 180 to couple a first optical fiber connecting device 100 to a second optical fiber connecting device 100' to form an optical fiber connecting device assembly or module 300 as shown in FIG. 4. Referring to FIGS. 1A, 1B and 4, the coupling mechanism can comprise a first slot 184*a* formed on a first side of housing 110 near clamping region 120 and a first dovetail protrusion 182*a* formed on a first side of the housing 110 near clamping region 125 and a corresponding second slot 184*b* formed on an opposite side of the housing across from the first dovetail protrusion and a second dovetail protrusion 182*b* disposed on an opposite side of the housing from the first slot. The dovetail protrusions are configured to slidingly and snugly engage the slots and dovetails of other optical fiber connecting devices to connect two or more exemplary optical fiber connecting device in a linear array. The integral coupling mechanism can comprise other known mechanical interlocking features that mate via a snap or interference fit.

FIGS. 5A-5E show an alternative embodiment of an exemplary optical fiber connecting device 200 in accordance with the current invention. Visually, optical fiber connecting device 200 appears much the same externally as optical fiber connecting device 100 already described.

Optical fiber connecting device 200 includes a housing 210 having a main body 212 extending from a first end to a second end and a channel 209 disposed longitudinally from the first end to the second end of the main body. The main body includes at least one widened area or opening, such as openings 214*a*, 214*b* formed along the top of the channel to provide access to the at least one cavity 215*a*, 215*b* within the main body (FIG. 5C).

First and second mechanical elements can be disposed within the cavities. For example mechanical element 230, shown in FIG. 5A, consists of a v-groove 232 integrally formed within the bottom wall of cavity 215*a* of the main body 212. The v-groove can be directly molded into the bottom of cavity 215 or the v-groove 332 can be precision molded, stamped or cut into tile 330, as shown in FIG. 6. Tile 330 can be inserted into the cavity 315 of main body 312 during assembly of the optical fiber connecting device.

Figure 5A:
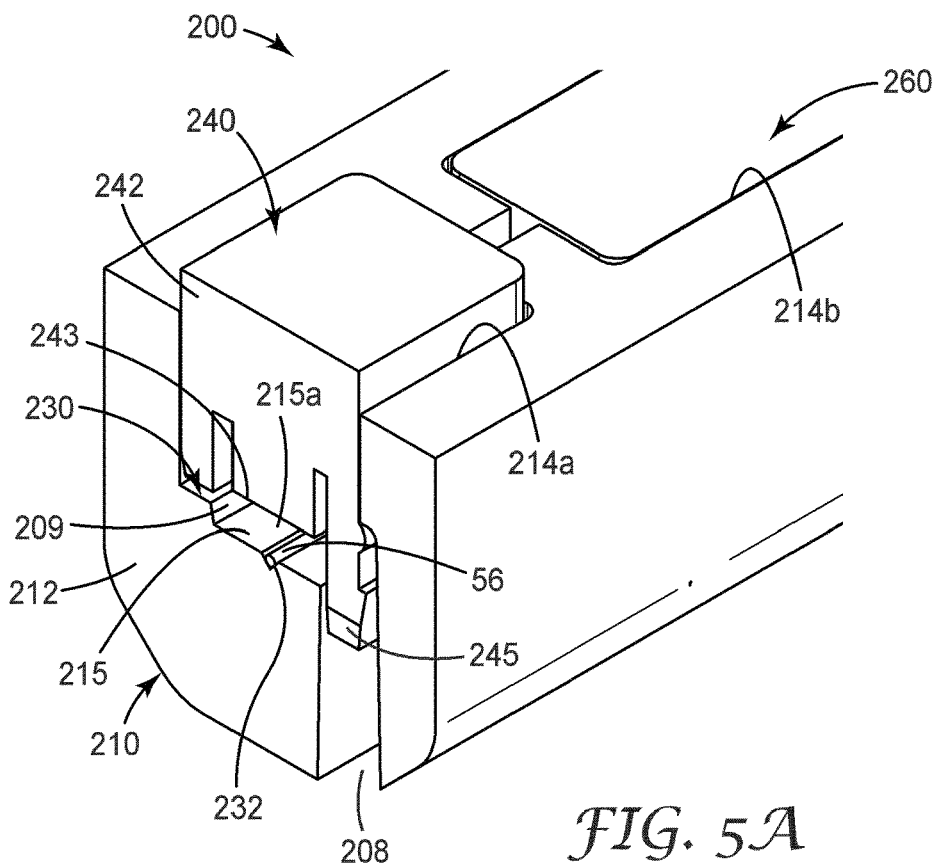
FIG. 5A-5E are five views of an alternative optical fiber connecting device according to the present invention.
Figure 5B:
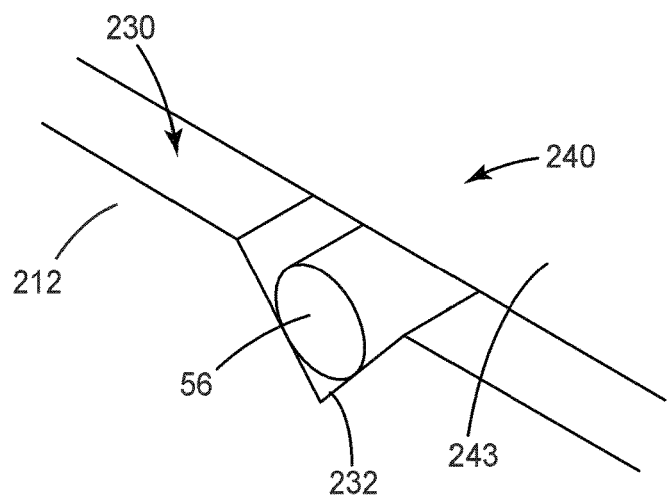
Figure 5C:
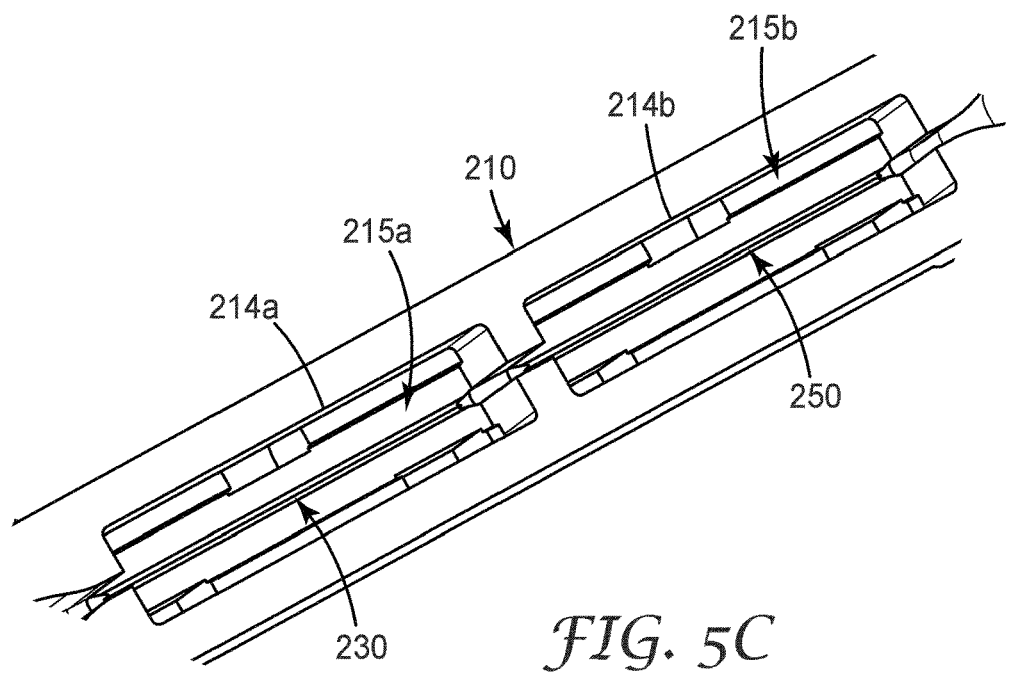
Figure 5D:
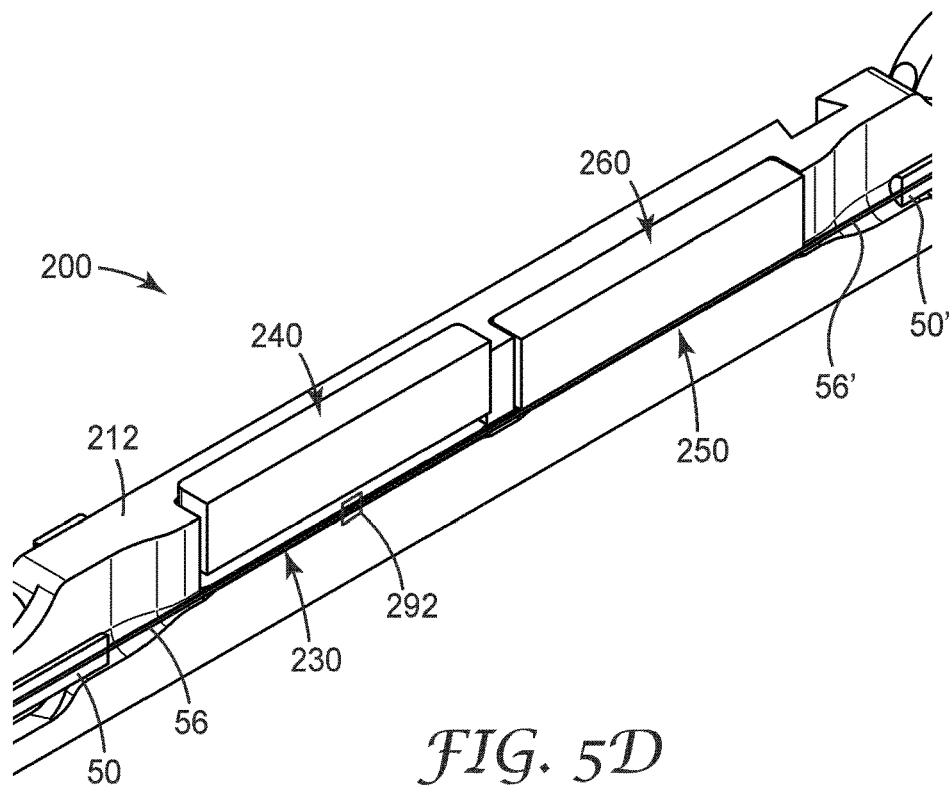
Figure 5E:
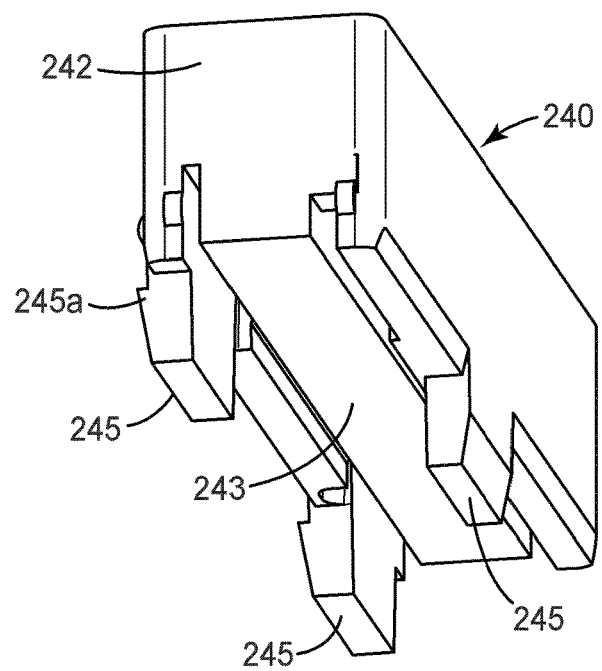
Figure 6:
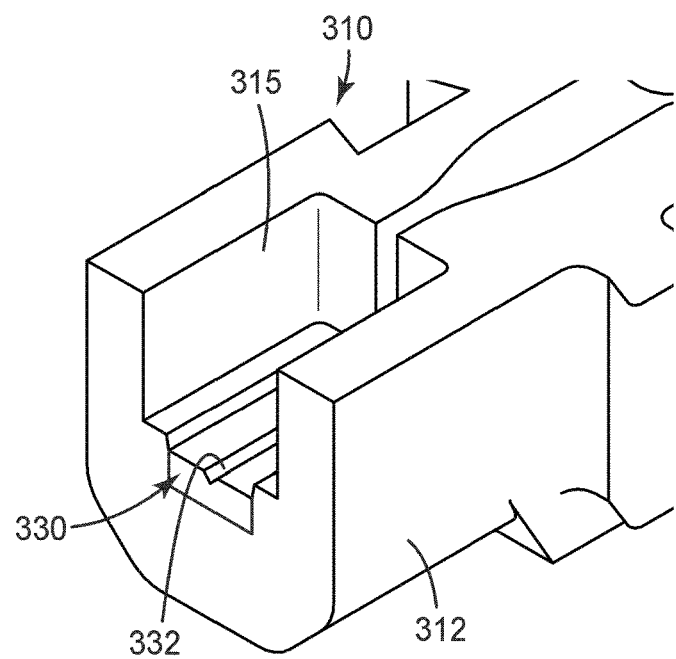
FIG. 6 is a sectional view of an alternative main body and mechanical element for the optical connection device of FIG. 5A.

The actuation caps 240, 260 each include a pressing foot, for example pressing foot 243 shown in FIGS. 5A, 5B and 5E. When the cap is actuated, the pressing foot can press on the top of a bare glass portion 56 of an optical fiber that is disposed in the v-groove to secure the optical fiber in the optical fiber connecting device. A detail view of actuating cap 240 is provided in FIG. 5E. Actuating cap 240 includes a main body portion 242 that extends along a length of the cap and a plurality of extensions 245 extending from the main body portion of the cap. The extensions serve as guides that aid in aligning the cap as it is inserted into the cavity within the housing's main body 212 of the exemplary optical fiber connecting device. In an exemplary aspect one or more of the extensions can have a lip 245*a* protruding from a surface of the extension to secure the actuation cap within the optical fiber connecting device after actuation to secure than optical fiber within the mechanical element.

As described previously the mechanical element can be opened inserting a tool into slots 208 formed in the main body 212 (FIG. 5A). The tool pushes on the extensions 245 on the actuation cap 240 to lift the cap permitting removal and/or repositioning of the bare glass portion of at least one optical fiber disposed in the mechanical element.

FIG. 5D shows a partial cross-sectional view of optical fiber connecting device 200 wherein the first mechanical element 230 is a mechanical splice element while the second mechanical element 250 acts as a gripping device wherein the optical interface (positioned in highlight frame 292) is disposed within the first mechanical element. Thus, the bare glass portion 56 of the first optical fiber 50 extends partially through the first mechanical element and the second optical fiber 50' extend through the second mechanical element and part way into the first mechanical element. The first activation cap 240 can be depressed to hold the splice between the first and second optical fibers in the exemplary connection device. In this way, the optical fiber connecting device 200 can be mounted on the end of the second optical fiber at a first time such as in the factory or during initial installation into the network by actuating the second mechanical element. Then at a later time, such as at the time when a customer requests services, the bare glass portion 56 of the first optical fiber can be inserted into the main body 212 and into the first mechanical element until resistance is felt and the fiber begins to bow when the terminal end of the first optical fiber abuts against the terminal end of the second optical fiber that is already installed in the connection device. The first actuation cap can then be depressed to anchor the first optical fiber in the connection device.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

We claim:

1. An optical fiber connecting device for housing first and second optical fibers, the first and second optical fibers each including a bare glass portion surrounded by a buffer layer, the connecting device comprising:

a housing comprising a main body having a first end, a second end, and a channel extending longitudinally through the main body, wherein the channel includes at least one opening formed along a top of the channel to provide access to a first cavity and a second cavity within the main body;

a first mechanical element disposed in the first cavity of the main body and a second mechanical element disposed in the second cavity of the main body for axially aligning and gripping the bare glass portion of the first and second optical fibers;

a first actuation cap placed over the first mechanical element through the at least one opening in the main body, wherein the first actuation cap includes two side walls defining respective cam surfaces that can be slid down over sides of the first mechanical element to secure a first bare glass portion of the first optical fiber within the first mechanical element; and a second actuation cap placed over the second mechanical element through the at least one opening in the main body, wherein the second actuation cap includes two side walls defining respective cam surfaces that can be slid down over sides of the second mechanical element to secure a second bare glass portion of the second optical fiber within the second mechanical element.

2. The optical fiber connecting device of claim 1, wherein the first mechanical element is configured to house a first mechanical splice having a first optical interface.

3. The optical fiber connecting device of claim 2, wherein the second mechanical element is configured to house a second mechanical splice having a second optical interface.

4. The optical fiber connecting device of claim 3, further comprising an optical fiber stub having a first end and a second end positioned within the main body of the connecting device wherein the first end of the optical fiber stub extends partially within the first mechanical element and wherein the second end of the optical fiber stub extends partially within the second mechanical element.

5. The optical fiber connecting device of claim 4, wherein the optical fiber stub comprises a sensor for sensing whether a connection is present between the first and second optical fibers.

6. The optical fiber connecting device of claim 1, further comprising an alignment element disposed between the first and second mechanical elements, wherein the first and second optical fibers make optical contact within the alignment element.

7. The optical fiber connecting device of claim 1, wherein the main body further comprises a first clamping region disposed and second cable clamping regions formed on opposing ends of the main body and disposed on either side of the first and second mechanical elements to provide strain relief for the first and second optical fibers within the connecting device.

8. The optical fiber connecting device of claim 7, wherein at least one of the first and second clamping regions comprises an alligator-style clamp.

9. The optical fiber connecting device of claim 1, further comprising an index matching gel at an optical interface within the optical fiber connecting device.

10. A method of connecting two optical fiber cables, comprising:
    providing a first optical fiber having an exposed first bare glass portion;
    providing a second optical fiber having an exposed second bare glass portion;
    sliding the first bare glass portion of the first optical fiber into a first end of an optical fiber connecting device that includes a housing with a main body, a first mechanical element disposed in a first cavity of the main body, and a second mechanical element disposed in a second cavity of the main body;
    locking the first optical fiber in the first mechanical element by depressing a first actuation cap, wherein the first actuation cap includes two side walls defining respective cam surfaces that slide down over sides of the first mechanical element when the first actuation cap is depressed;
    sliding the second bare glass portion of the second optical fiber into a second end of the optical fiber connecting device; and
    locking the second optical fiber in the second mechanical element by depressing a second actuation cap, wherein the second actuation cap includes two side walls defining respective cam surfaces that slide down over sides of the second mechanical element when the second actuation cap is depressed.

11. The method of claim 10, wherein the first optical fiber is locked in the first mechanical element in a factory and wherein the second optical fiber is locked in the second mechanical element in a field.

12. The method of claim 10, wherein the first optical fiber and the second optical fiber are respectively locked in the first mechanical element and the second mechanical element in a field.

13. An optical fiber connecting device module to connect a plurality of first and second optical fibers, the first and second optical fibers each including a bare glass portion surrounded by a buffer layer, the module comprising:
    a first optical fiber connecting device and a second optical fiber connecting device attached to the first optical fiber connecting device by an integral coupling mechanism, wherein each of the first and second optical fiber connecting devices each comprise:
        a housing comprising a main body having a first end, a second end, and a channel extending longitudinally through the main body, wherein the channel includes at least one opening formed along a top of the channel to provide access to a first cavity and a second cavity within the main body;
        a first mechanical element disposed in the first cavity of the main body and a second mechanical element disposed in the second cavity of the main body for axially aligning and gripping the bare glass portion of the first and second optical fibers;
        a first actuation cap placed over the first mechanical element through the at least one opening in the main body, wherein the first actuation cap includes two side walls defining respective cam surfaces that can be slid down over sides of the first mechanical element to secure a first bare glass portion of the first optical fiber within the first mechanical element; and
        a second actuation cap placed over the second mechanical element through the at least one opening in the main body, wherein the second actuation cap includes two side walls defining respective cam surfaces that can be slid down over sides of the second mechanical element to secure a second bare glass portion of the second optical fiber within the second mechanical element.

14. The module of claim 13, wherein the integral coupling mechanism comprises at least a dovetail protrusion integrally formed on the housing of the first optical fiber connecting device and a slot formed in the housing of the second optical fiber connecting device, wherein the dovetail protrusion slides into the slot to connect the first and second optical fiber connecting devices.

15. The optical fiber connecting device of claim 1, wherein the at least one opening of the channel comprises a first opening through which the first actuation cap extends and a second opening through which the second actuation cap extends.

16. An optical fiber connecting device module to connect a plurality of first and second optical fibers, the first and second optical fibers each including a bare glass portion surrounded by a buffer layer, the module comprising:
    a first optical fiber connecting device and a second optical fiber connecting device attached to the first optical fiber connecting device by an integral coupling mechanism, wherein each of the first and second optical fiber connecting devices each comprise:
        a housing comprising a main body configured to contain a first mechanical element and a second mechanical element for axially aligning and gripping the bare glass portion of the first and second optical fibers;
        a first actuation cap disposed adjacent to the first mechanical element that can be actuated to secure a first bare glass portion of the first optical fiber within the first mechanical element; and
        a second actuation cap disposed adjacent to the second mechanical element that can be actuated to secure a second bare glass portion of the second optical fiber within the second mechanical element,
    wherein the integral coupling mechanism comprises at least a dovetail protrusion integrally formed on the housing of the first optical fiber connecting device and a slot formed in the housing of the second optical fiber connecting device, wherein the dovetail protrusion slides into the slot to connect the first and second optical fiber connecting devices.

\* \* \* \* \*

UNITED STATES PATENT AND TRADEMARK OFFICE
CERTIFICATE OF CORRECTION

PATENT NO. : 10,345,529 B2
APPLICATION NO. : 15/762261
DATED : July 9, 2019
INVENTOR(S) : Lisong Cao Page 1 of 1

It is certified that error appears in the above-identified patent and that said Letters Patent is hereby corrected as shown below:

In the Claims

In Column 11, Line 16, Claim 7, after "second" delete "cable".

Signed and Sealed this
Fourteenth Day of January, 2020

Andrei Iancu
*Director of the United States Patent and Trademark Office*